(12) United States Patent
Leimbach et al.

(10) Patent No.: US 6,370,938 B1
(45) Date of Patent: Apr. 16, 2002

(54) METHOD AND DEVICE FOR DETERMINING A QUANTITY DESCRIBING THE HEIGHT OF THE CENTER OF GRAVITY OF A VEHICLE

(75) Inventors: Klaus-Dieter Leimbach, Moeglingen; Gabriel Wetzel, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/191,948

(22) Filed: Nov. 13, 1998

(30) Foreign Application Priority Data

Nov. 22, 1997 (DE) .......................... 197 51 935

(51) Int. Cl.$^7$ .......................... G01B 3/30; G01B 21/00; G01P 21/00
(52) U.S. Cl. ...................................... 73/1.81
(58) Field of Search ................. 73/117, 11.08, 73/504.09, 1.81, 459, 65.04, 65.07, 510, 518; 280/442, 755, 772; 180/209, 248; 303/9.69, 15

(56) References Cited

U.S. PATENT DOCUMENTS

| | | | |
|---|---|---|---|
| 5,168,749 A | * 12/1992 | Nugent | ...................... 73/65.04 |
| 5,338,106 A | 8/1994 | Rothen et al. | |
| 5,579,228 A | * 11/1996 | Kinbrough et al. | ......... 280/442 |
| 5,579,230 A | * 11/1996 | Lin et al. | ...................... 73/117 |
| 5,772,289 A | * 6/1998 | Nakazawa et al. | ......... 303/9.69 |
| 5,947,516 A | * 9/1999 | Ishikawa | ...................... 280/755 |

FOREIGN PATENT DOCUMENTS

| | | |
|---|---|---|
| DE | 3222149 C2 | 11/1983 |
| DE | 32 22 149 | 11/1983 |
| DE | 44 16 991 | 11/1995 |
| DE | 4416991 A1 | 11/1995 |
| EP | 0 807 562 | 11/1997 |

OTHER PUBLICATIONS

Zanten, et al., "FDR—Die Fahrdynamik–regelung von Bosch", ATZ Automobiltechnische Zeitschrift 96 (1994) Nov., No. 11, Stuttgart, Germany.

* cited by examiner

*Primary Examiner*—Benjamin R. Fuller
*Assistant Examiner*—Octavia Davis
(74) *Attorney, Agent, or Firm*—Kenyon & Kenyon

(57) ABSTRACT

A quantity describing the wheel rpm is determined for at least one wheel in this method of determining a quantity describing the height of the center of gravity of a vehicle. A quantity describing wheel performance is determined for at least one wheel at least as a function of the quantity describing the wheel rpm of the corresponding wheel. A quantity describing the height of the center of gravity of the vehicle is determined at least as a function of the quantity that is determined for at least one wheel and describes wheel performance of this wheel. This method of determining the quantity describing the height of the center of gravity of a vehicle is used as part of a method of stabilizing the vehicle.

13 Claims, 4 Drawing Sheets

METHOD AND DEVICE FOR DETERMINING A QUANTITY DESCRIBING THE HEIGHT OF THE CENTER OF GRAVITY OF A VEHICLE

FIELD OF THE INVENTION

The present invention relates to a method and a device for determining a quantity describing the height of the center of gravity of a vehicle.

BACKGROUND INFORMATION

Various versions of methods and devices for determining a quantity describing the height of the center of gravity of a vehicle are described in the related art.

German Patent No. 32 22 149 C2 describes a device for preventing a vehicle from tilting sideways. This device contains, among other things, a means for calculating the height of the overall center of gravity of the vehicle. This vehicle is a straddle loader for shipping large-volume containers. In calculating the height of the overall center of gravity of the vehicle, it is assumed that both the weight of the straddle loader and the height of the center of gravity of the straddle loader are known. The height and weight of the container are each determined by a measuring device. The height of the center of gravity of the vehicle is determined from the weight of the straddle loader, the height of the center of gravity of the straddle loader, the weight of the container and the height of the center of gravity of the container.

German Patent No. 44 16 991 A1 describes a method and device for warning a truck driver of rollover danger in turning a corner. To do so, the type of vehicle and status information, such as the vehicle weight and speed relevant to the risk of tilting when turning, are determined before the vehicle enters the curve. The risk of tilting when turning at the detected driving speed is determined as a function of the center of gravity of the vehicle mass and the radius of the curve. At least a signal indicating excessive driving speed is triggered if it is found that there is a danger of tilting or if the vehicle is below a predetermined safety margin for the risk of tilting.

The total weight of the vehicle is determined as follows: wheel load sensors are provided in a line across the direction of travel in the straightest possible stretch of roadway before a curve. The total weight is determined by taking the sum of the wheel loads detected by the individual wheel load sensors. Furthermore, a sensor is provided before the curve for detecting the height and height contour of the respective vehicle. Thus, the weight-dependent height of the center of gravity of the vehicle can be estimated as a function of the total weight of the vehicle, its height and height contour as well as selected information about the type of vehicle specified.

SUMMARY OF THE INVENTION

An object of the present invention is to improve existing methods and devices for determining a quantity describing the height of the center of gravity of a vehicle.

With the method according to the present invention for determining at least one quantity describing the height of the center of gravity of the vehicle, a quantity describing the wheel rpm is determined for at least one wheel. For this at least one wheel, a quantity describing the wheel performance is determined at least as a function of the wheel rpm of the corresponding wheel. A quantity describing the height of the center of gravity of the vehicle is determined at least as a function of the quantity determined for the minimum of one wheel, which describes the wheel performance of this wheel.

The method according to the present invention for determining at least one quantity describing the height of the center of gravity of the vehicle is advantageously used within the context of a method of stabilizing the vehicle. In particular, the method according to the present invention is used within the context of a method of preventing vehicle rollover. It is especially advantageous if a velocity parameter is determined at least as a function of at least one quantity describing the height of the center of gravity of the vehicle, and if a determination is made at least as a function of this velocity parameter as to whether there is a tendency for the vehicle to tilt about a vehicle axis oriented in the longitudinal direction of the vehicle. If the vehicle does have a tendency to tilt, at least one braking measure is advantageously performed on at least one wheel, and/or engine measures and/or chassis actuators are initiated in order to stabilize the vehicle, in particular to prevent the vehicle from turning over.

The phrase "a vehicle axis oriented in the longitudinal direction of the vehicle" is understood as follows: first, the vehicle axis about which the vehicle has a tendency to tilt may be the actual longitudinal axis of the vehicle. Second, it may be a vehicle axis which is twisted about a certain angle with respect to the actual longitudinal axis of the vehicle. It does not matter whether the twisted vehicle axis passes through the center of gravity of the vehicle. The case of the twisted vehicle axis should also permit an orientation of the vehicle axis such that the vehicle axis corresponds either to a diagonal axis of the vehicle or an axis parallel to that.

It is advantageous to determine the quantity describing the height of the center of gravity as a function of the drive slip and/or wheel slip prevailing on at least one wheel as compared with a corresponding threshold value. On the basis of this comparison, different determinations of the at least one quantity describing the height of the center of gravity of the vehicle can be performed. Thus, if the value of the drive slip and/or wheel slip prevailing on at least one wheel is smaller than the corresponding threshold value, the corresponding quantity describing the height of the center of gravity of the vehicle is determined at least as a function of the quantity describing the wheel performance which was determined for the minimum of one wheel in the present time increment. However, if the value of the drive slip and/or wheel slip determined for the minimum of one wheel is greater than the corresponding threshold value, the corresponding quantity describing the height of the center of gravity of the vehicle is determined at least as a function of the quantity describing the wheel performance which was determined for the minimum of one wheel in a preceding time increment.

A quantity depending on the wheel load acting on the respective wheel is determined advantageously as the quantity describing the wheel performance of the respective wheel. For example, quantities describing the diameter or radius of the respective wheel are especially advantageous because a curve-induced displacement of the center of gravity of the vehicle has an especially strong effect on the diameter of the vehicle wheels. Therefore, a displacement of the center of gravity of a vehicle and a consequent tendency of the vehicle to tilt can be detected directly on the basis of vehicle wheel diameter.

The quantity describing wheel performance of the respective wheel is advantageously determined at least as a function of the quantity describing the wheel rpm of the respective wheel, a quantity describing the vehicle speed, a quantity representing the transverse dynamics of the vehicle and a quantity describing the geometry of the vehicle. The quantity describing vehicle speed is determined at least as a function of the quantities describing the wheel rpm determined for the wheels. The quantity representing the transverse dynamics of the vehicle may advantageously be a quantity describing the yaw and/or transverse acceleration of the vehicle.

The corresponding quantity describing the height of the center of gravity of the vehicle is advantageously determined at least as a function of a quantity describing the performance of a wheel axle, corresponding in particular to a quantity describing the angle of inclination of the wheel axle to the road surface. The quantity describing the performance of the wheel axle is determined at least as a function of the quantities determined for the wheels on one axle, describing the wheel performance, and taking into account a quantity representing the vehicle geometry.

In determining the corresponding quantity describing the height of the center of gravity of the vehicle, not only is the quantity describing the performance of the wheel axle taken into account, but a quantity describing the transverse dynamics of the vehicle, a quantity describing the load acting on the wheel axle, a quantity describing the vehicle geometry and a quantity representing rigidity, in particular the resulting vertical rigidity of the wheels on the respective wheel axle, are also taken into account.

DETAILED DESCRIPTION

Figure 1A:
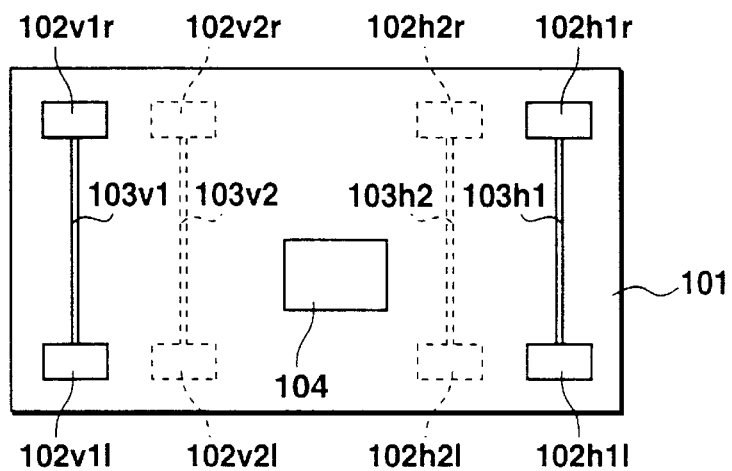
FIGS. 1a and 1b show different road vehicles with which the method according to the present invention is used.
Figure 1B:
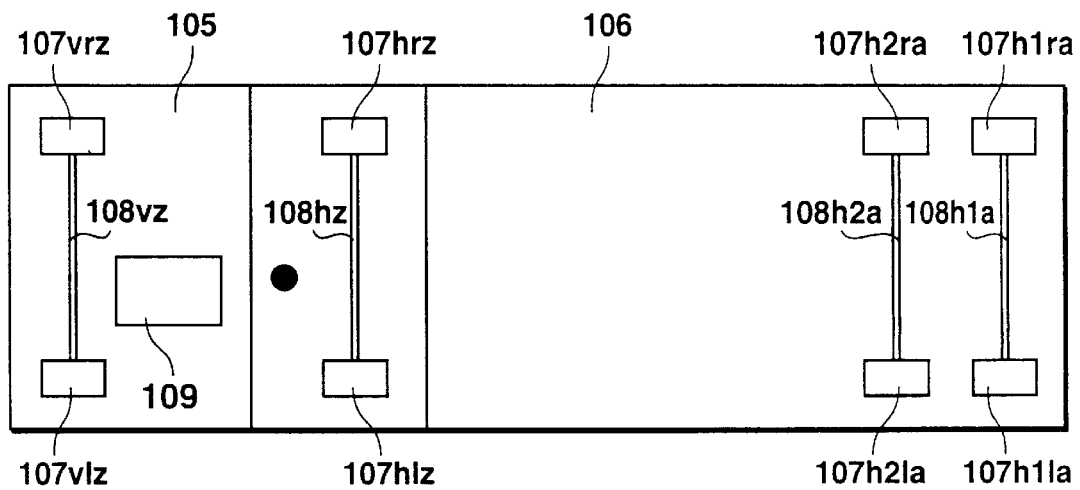

FIGS. 1a and 1b show different road vehicles where the method according to the present invention can be used.

FIG. 1a shows a single-unit vehicle 101. This vehicle may be a passenger vehicle or a commercial vehicle. Single-unit vehicle 101 shown in FIG. 1a is a vehicle with at least two wheel axles, as indicated by the dotted lines for part of the diagram. The wheel axles of vehicle 101 are labeled as $103ix$, where the index i indicates whether it is a front axle (v) or a rear axle (h). For vehicles with more than two axles, the index i indicates which of the front or rear axles is involved. The following assignment is used: the index with the smallest value is assigned to the front axle or rear axle closest to the vehicle end. The farther the wheel axle is from the end of the vehicle, the larger the value of index x. Wheels $102ixj$ are assigned to axles $103ix$. Indices i and x have meanings corresponding to those described above. Index j indicates whether the wheel is on the right (r) or left (l) side of the vehicle. In the diagram of wheels $102ixj$, no distinction was made between single wheels and twin wheels. Furthermore, vehicle 101 has a control unit 104 in which the device according to the present invention is implemented for carrying out the method according to the present invention.

To illustrate the diagram presented in FIG. 1a, it should be explained as an example that a twin-axle vehicle has a front axle $103v1$ with its wheels $102v1r$ and $102v1l$, as well as a rear axle $103h1$ with its wheels $102h1r$ and $102h1l$. In the normal case, a triple-axle vehicle has a front axle $103v1$ with wheels $102v1r$ and $102v1l$, a first rear axle $103h1$ with wheels $102h1r$ and $102h1l$, and a second rear axle $103h2$ with wheels $102h2r$ and $102h2l$.

FIG. 1b shows a vehicle combination with a truck tractor rig 105 and a semitrailer 106. The diagram shown here is not intended to restrict the scope of the invention in any way; a vehicle combination with a truck tractor rig and a draw-bar trailer is also conceivable. Truck tractor rig 105 should have wheel axles $108iz$. Wheels $107ijz$ are assigned to wheel axles $108iz$. Indices i and j have the meanings explained above in conjunction with FIG. 1a. Index z indicates that these are wheels or wheel axles of the truck tractor rig. Truck tractor rig 105 also has a control unit 109 which determines a quantity describing the height of the center of gravity of truck tractor rig 105 and/or a quantity describing the height of the center of gravity of semitrailer 106. Semitrailer 106 should have two wheel axles $108ixa$. Wheels $107ixja$ are assigned to two wheel axles 108ixa accordingly. Indices i, x and j have the meanings already explained in conjunction with FIG. 1a. Index a indicates components of semitrailer 106. The number of wheel axles shown in FIG. 1b for truck tractor rig 105 or for semitrailer 106 shall not be construed as restrictive in any way. Control unit 109 may also be arranged in semitrailer 106 instead of truck tractor rig 105.

The characterization with indices a, i, j, x and z in FIGS. 1a and 1b will be similar for all quantities or components for which they are applicable.

Figure 2:
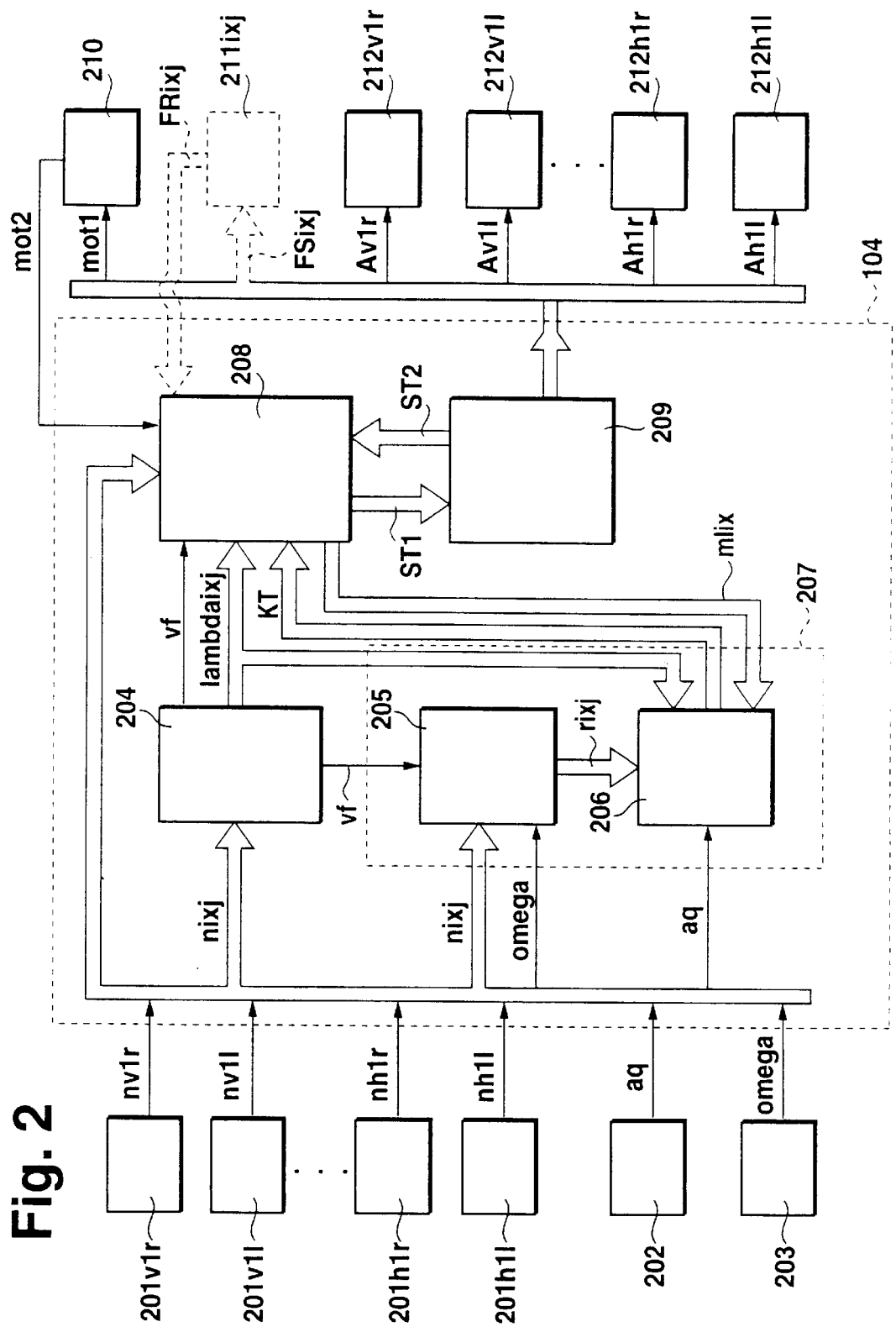
FIG. 2 shows a survey diagram of the device according to the present invention for carrying out the method according to the present invention.

FIG. 2 shows an exemplary device according to the present invention for carrying out the method according to the present invention.

It should be pointed out here that the discussion of the device according to the present invention on the basis of a single-unit vehicle should not represent a restriction of any kind. The method according to the present invention and the device according to the present invention can also be used for a vehicle combination such as that illustrated in FIG. 1b.

The vehicle on which the embodiment is based is a single-unit vehicle such as that illustrated in FIG. 1a. Furthermore, it is assumed that this single-unit vehicle has at least two wheel axles $103ix$. These two wheel axles are front axle $103v1$ with wheels $102v1r$ and $102v1l$ and rear axle $103h1$ with wheels $102h1r$ and $102h1l$. Wheel rpm sensors $201v1r$, $201v1l$, $201h1r$ and $201h1l$ are shown in FIG. 2. Depending on the number of wheel axles of the single-unit vehicle, additional wheel rpm sensors $201ixj$ may also be taken into account, as indicated in FIG. 2. Wheel rpm sensors $201ixj$ determine quantities nixj which describe the wheel rpm of corresponding wheel $102ixj$. Quantities nixj are sent to blocks 204, 205 and 208.

Furthermore, it is assumed that vehicle 101 has a transverse acceleration sensor 202 and a yaw sensor 203. It should be pointed out here that use of transverse acceleration sensor 202 and yaw sensor 203 should not be a restriction of any kind. For example, instead of determining a quantity aq describing the transverse acceleration with the help of a transverse acceleration sensor, this quantity can also be determined from quantities nixj. The same thing is also true of the quantity describing the yaw of the vehicle.

Quantity aq describing the transverse acceleration of the vehicle determined with transverse acceleration sensor 202 is sent to block 208 as well as block 206. Quantity omega describing the yaw of the vehicle, determined with yaw sensor 203, is sent to blocks 205 and 208.

A quantity vf describing the vehicle speed is determined in a known way from quantities nixj in block 204. This quantity vf is sent from block 204 to blocks 205 and 208. Furthermore, quantities lambdaixj describing the drive slip and/or wheel slip are determined in block 204 from quantities nixj and vf in a known way. These quantities lambdaixj are sent to block 206 as well as block 208.

Quantities rixj describing the performance of the wheels are determined in block 205 from quantity vf, quantities nixj, and quantity omega. These quantities rixj depend on the wheel load acting on the respective wheel. Quantities rixj are in particular the dynamic running radii of the wheels, which are determined with the equation:

$$rixj = \frac{vf \pm a \cdot omega}{nixj}$$

where quantity a in this equation describes half the wheel base of the vehicle. A plus sign is used for the wheels on the outside of the curve, and a minus sign is used for the wheels on the inside of the curve.

It should be pointed out here that the term omega used in the above equation to describe the yaw of the vehicle can also be replaced by an expression derived from the vehicle speed and the transverse acceleration of the vehicle. In this case, quantity aq would have to be sent instead of omega to block 205.

Quantities rixj which describe wheel performance and correspond to the dynamic running radii of the wheels are sent from block 205 to block 206. Since the quantities rixj describing the wheel performance are the dynamic running radii, these quantities describe the diameter and accordingly the radius of the respective wheel.

At least one quantity describing the height of the center of gravity of the vehicle is determined in block 206 from quantities lambdaixj, rixj and aq supplied to it and from quantities mlix, each describing the axle-based load. The concrete determination of the at least one quantity describing the height of the center of gravity of the vehicle will be discussed in conjunction with FIG. 3 described below.

The at least one quantity describing the height of the center of gravity of the vehicle can be used as part of detection of a tendency of a vehicle to tilt about a vehicle axis oriented in the longitudinal direction of the vehicle. In this regard, various queries are performed in block 206. If it is found in block 206 that there is a tendency for the vehicle to tilt about the vehicle axis oriented in the longitudinal direction of the vehicle, a quantity KT is generated and sent to block 208. This quantity KT notifies the controller or vehicle controller 208 whether or not the vehicle has a tendency to tilt over. In FIG. 2, two components 205 and 206 which are present in the control unit and are essential to the present invention are combined into block 207.

Controller 208 or vehicle controller 208 is implemented in control unit 104. Controller 208 is, for example, a controller whose basic function is to control a function describing the driving dynamics of the vehicle, e.g., a quantity depending on the transverse acceleration and/or yaw of the vehicle, by implementing measures involving the wheel brakes and/or the engine. Such a controller is described, for example, in the publication "FDR—die Fahrdynamikregelung von Bosch" [FDR—control of driving dynamics by Bosch] in *Automobiltechnische Zeitschrift* (*ATZ*) [Automotive Engineering Journal], vol. 16, no. 11 (1994), pages 674–689. The control whose basic function takes place in block 208 is based in a known manner on quantities nixj, aq, omega, vf, lambdaixj which are sent to block 208, and a quantity mot2, which describes the engine rpm of engine 210, for example, and is sent from engine 210 to block 208, as well as quantities ST2, which are sent to block 208 from a block 209, representing the control logic for actuators contained in the vehicle.

In addition to the control whose basic function is implemented in block 208, rollover prevention is implemented in controller 208. Rollover prevention is implemented essentially on the basis of quantities KT which are generated in block 206 as part of rollover detection. With quantities KT, controller 208 can be notified first that there is a tendency for the vehicle to tilt about a vehicle axis oriented in the longitudinal direction of the vehicle; in addition, controller 208 can be notified of the extent of this tilting tendency. Furthermore, quantities KT may contain information on how severe this tilting tendency is and which wheels are involved.

Axle-based wheel loads mlix are required in block 206 for determining the minimum of one quantity describing the height of the center of gravity of the vehicle. These wheel loads are determined in controller 208 in a known way from the wheel rpm and sent from block 208 to block 206.

Controller 208 generates quantities ST1, which are sent to control logic 209 with which the actuators provided for the vehicle are driven. With quantities ST1, control logic 209 is notified of which actuators are to be driven and how.

To prevent the vehicle from rolling over about a vehicle axis oriented in the longitudinal direction of the vehicle, the following measures involving the actuators of the vehicle are conceivable, for example: first, vehicle speed can be reduced by braking or reducing engine torque. Second, the rollover tendency of the vehicle can be counteracted by individual braking measures on the individual wheels. Furthermore, a rolling motion of the vehicle can be limited by measures involving the chassis actuators provided for the vehicle.

Quantities ST1 generated by controller 208 are converted in block 209, the control logic, into control signals for engine 210 and control signals for the actuators of the vehicle. To control engine 210, the control logic generates a signal mot1 with which the throttle valve setting of the engine, for example, can be influenced. For controlling chassis actuators 211*ixj*, control logic 209 generates signals Fsixj with which the damping effect or rigidity implemented by chassis actuators 211*ixj* can be influenced. For controlling actuators 212*ixj*, which are designed as brakes in particular, control logic 209 generates signals Aixj with which the braking forces generated by actuators 212*ixj* on the respective wheels can be influenced. Control logic 209 generates quantities ST2 which are sent to controller 208 and which contain information about controlling the individual actuators.

The chassis of the vehicle is influenced with chassis actuators 211*ixj*. In order for the controller to know the actual state of chassis actuators 211*ixj*, signals Frixj are sent to controller 208 from chassis actuators 211*ixj*.

It should be pointed out here that in addition to the actuators shown in FIG. 2, it is also conceivable to use "retarders."

The brake system used in FIG. 2 may be a hydraulic or pneumatic brake system or an electrohydraulic or electropneumatic brake system.

Figure 3:
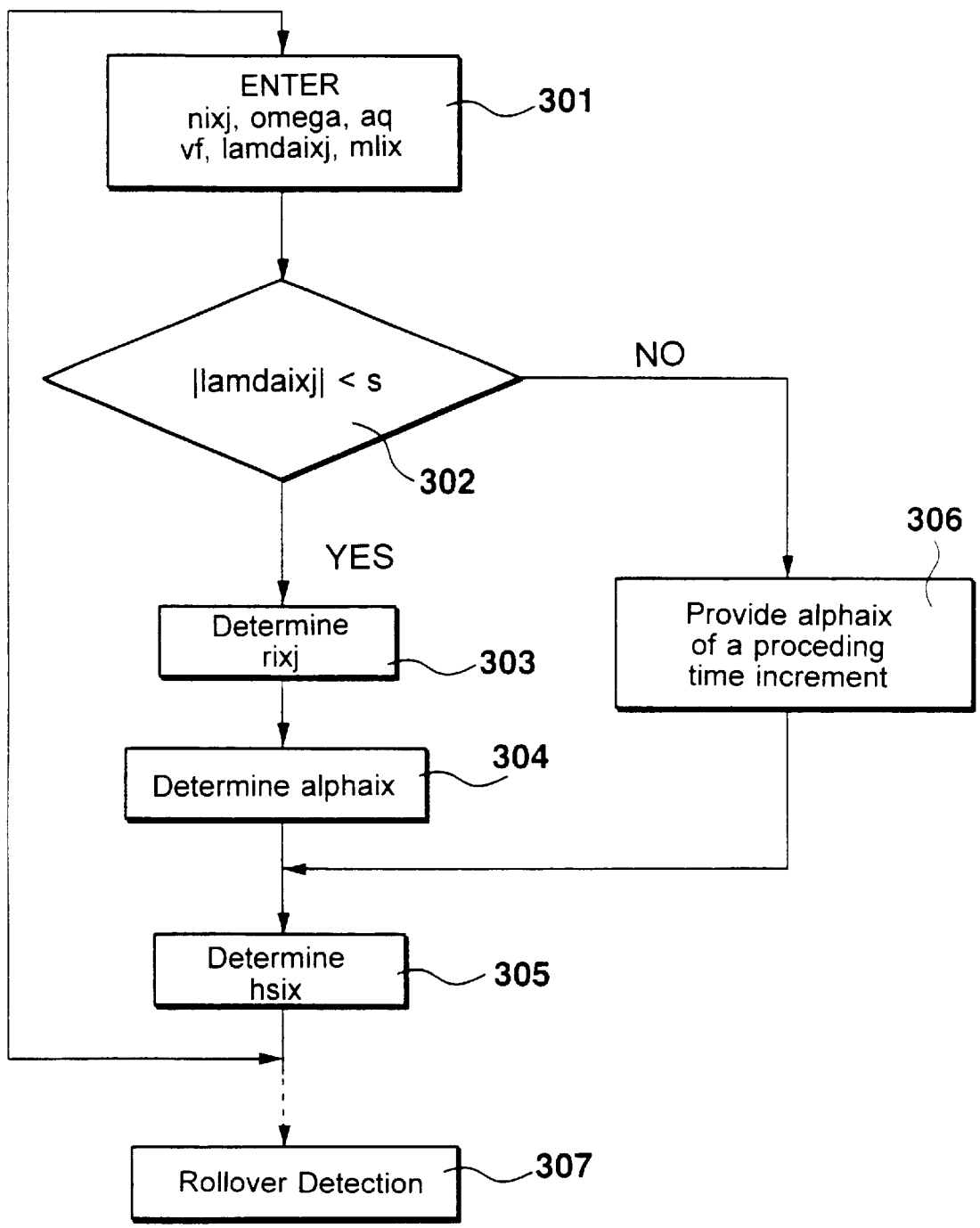
FIG. 3 shows a flow chart illustrating the steps for carrying out the method according to the present invention.

The sequence of the method according to the present invention is explained with the help of the flow chart in FIG. 3. The flow chart shown in FIG. 3 describes the sequence of the method on which the device according to the present invention as shown in FIG. 2 is based, taking place for a single-unit vehicle as shown in FIG. 1a. The method according to the present invention takes place essentially in blocks 205 and 206.

The method according to the present invention begins with a step 301 where quantities nixj, omega, aq, vf, lambdaixj and mlix are entered. A step 302 is carried out following step 301.

In step 302, the value of quantity lambdaixj describing the drive slip and/or wheel slip is compared with a threshold value S. The query taking place in step 302 is performed for the following reason: quantities rixj describing wheel performance and representing the dynamic running radii of the wheels can be determined in step 303 only if the wheels are more or less slip-free, i.e., if the drive slip and/or wheel slip is smaller than a predetermined threshold value. If this is not the case, then quantities rixj describing wheel performance cannot be determined satisfactorily. If there is too much drive slip and/or wheel slip on the wheels, it would lead to mistakes in determining quantities rixj describing wheel performance, which would in turn lead to mistakes in determining the quantity describing the height of the center of gravity of the vehicle.

If it is found in step 302 that the absolute value of quantity lambdaixj is smaller than the corresponding threshold value, then a step 303 is carried out after step 302. However, if it is found in step 302 that the absolute value of quantity lambdaixj is greater than corresponding threshold value S, a step 306 is carried out following step 302.

It should be pointed out here that the indexed presentation used in step 302 is intended to mean that the query is to be performed for any individual wheel, for any number of wheels, or for all the wheels of the vehicle.

In step 303, quantities rixj describing the respective wheel performance are determined according to the equation:

$$rixj = \frac{vf \pm a \cdot omega}{nixj}$$

Vehicle speed vf, yaw omega of the vehicle, corresponding wheel rpm nixj and half the wheel base of the vehicle enter into the determination of quantities rixj representing the prevailing dynamic running radius.

Quantities rixj can be determined only if the wheel slip is not too great, i.e., they can be determined only if the wheel speeds and vehicle speed do not differ too much. If there is too much difference between the wheel speeds and vehicle speed, as is the case, for example, when there is severe slip on individual wheels, there may be errors in the determination of the quantity describing the height of the center of gravity of the vehicle in step 305 on the basis of quantities rixj determined in this condition of the vehicle.

Following step 303, a step 304 is carried out. In this step, quantities alphaix describing the behavior of the respective wheel axle are determined according to the equation $$alpahix = \left| \frac{rixl - rixr}{2 \cdot a} \right|$$

According to this equation, the quantities determined for the wheels of this wheel axle, describing the wheel performance and wheel base 2a of the vehicle, enter into the determination of quantity alphaix, describing the behavior of one wheel axle, in particular the angle of inclination of the wheel axle to the roadway. The above equation for the angle of inclination alphaix represents an approximation which is valid for small angles alphaix. Following step 304, a step 305 is carried out.

In step 305, at least one quantity hsix describing the height of the center of gravity of the vehicle is determined according to the equation:

$$hsix = \frac{C \cdot a^2}{mlix \cdot aq} \cdot alphaix$$

In this equation, C represents the resulting vertical rigidity of the wheels belonging to the wheel axle. Quantity a corresponds to half the wheel base of the wheel axle, quantity alphaix corresponds to the angle of inclination of the wheel axle to the roadway. Quantity mlix corresponds to the load acting on the wheel axle. Quantity aq corresponds to the transverse acceleration acting on the vehicle.

Quantity hsix corresponds to the height of the center of gravity of the vehicle based on axle 103ix. A plurality of such heights of the center of gravity may be determined. Theoretically, a corresponding height of the center of gravity hsix may be determined for each wheel axle by the method according to the present invention. These center of gravity heights may be processed individually as part of rollover detection or prevention, or they may be used to derive a quantity which is processed further as needed.

Following step 305, step 301 is performed again. As indicated by the dotted-line arrow in FIG. 3, quantity hsix determined in step 305 may be used in rollover detection in step 307.

On the basis of the at least one quantity hsix describing the center of gravity height of the vehicle, it is possible to determine whether the vehicle has a tendency to tilt about a vehicle axis oriented in the longitudinal direction of the vehicle by the following method:

Starting with at least one quantity hsix, representing an axle-based center of gravity height in particular and describing the center of gravity height of the vehicle, a speed limit value for the vehicle to turn a corner is determined. The speed limit value indicates the vehicle speed at which tilting of the vehicle about a vehicle axis oriented in the longitudinal direction of the vehicle cannot be expected. To determine the speed limit value as a function of the quantity describing the center of gravity height of the vehicle, reference is made for example to the formula given on page 346 in *Kratfahrtechnisches Taschenbuch* [Automotive Handbook], VDI Verlag, 21$^{st}$ edition. A determination is performed to show whether the absolute value of the difference formed from the actual vehicle speed and the speed limit value is smaller than or equal to a corresponding threshold value. If the absolute value of the difference is smaller than or equal to the threshold value, then the vehicle has a tendency to tilt about a vehicle axis oriented in the longitudinal direction of the vehicle. Consequently, suitable stabilization measures are initiated.

If it is found in step 302 that the value of quantity lambdaixj is greater than the respective threshold value S, then a step 306 is carried out following step 302. In step 306, quantity alphaix of a preceding time increment describing the behavior of the corresponding wheel axle is supplied. Quantity alphaix of a preceding time increment can be supplied in various ways. To do so, for example, quantity alphaix for a preceding time increment when the query in step 302 was satisfied is stored temporarily. Thus, the value of quantity alphaix of the preceding time increment can be read out of the memory and made available in the time increment in which step 306 is executed. In addition, the values determined in step 303 for quantities rixj may be deposited in a memory. In this case, quantity alphaix may be determined in step 306 as a function of quantities rixj of the preceding time increment.

Step 305 is carried out following step 306.

At this point the query taking place in step 302 should be discussed again. As mentioned above, this query is necessary because if the slip is too great, the determination of quantities rixj would be distorted. Quantity rixj can be determined only if the value of quantity lambdaixj is smaller than corresponding threshold value S. In this case, quantity hsix is determined in step 305 as a function of quantities rixj determined in the most recent time increment. In the event the value of quantity lambdaixj is greater than corresponding threshold value S, quantity alphaix of a preceding time increment is supplied in step 306, as described above. In this case, quantities describing wheel performance determined in a preceding time increment enter into the determination of quantity hsix on the basis of having taken into account quantity alphaix of a preceding time increment.

There shall be no restriction of the idea essential to the invention due to the fact that only a single-unit vehicle is used for the illustration in FIG. 3. The flow chart illustrated in FIG. 3 can also be applied accordingly for a combination of vehicles.

Figure 4:
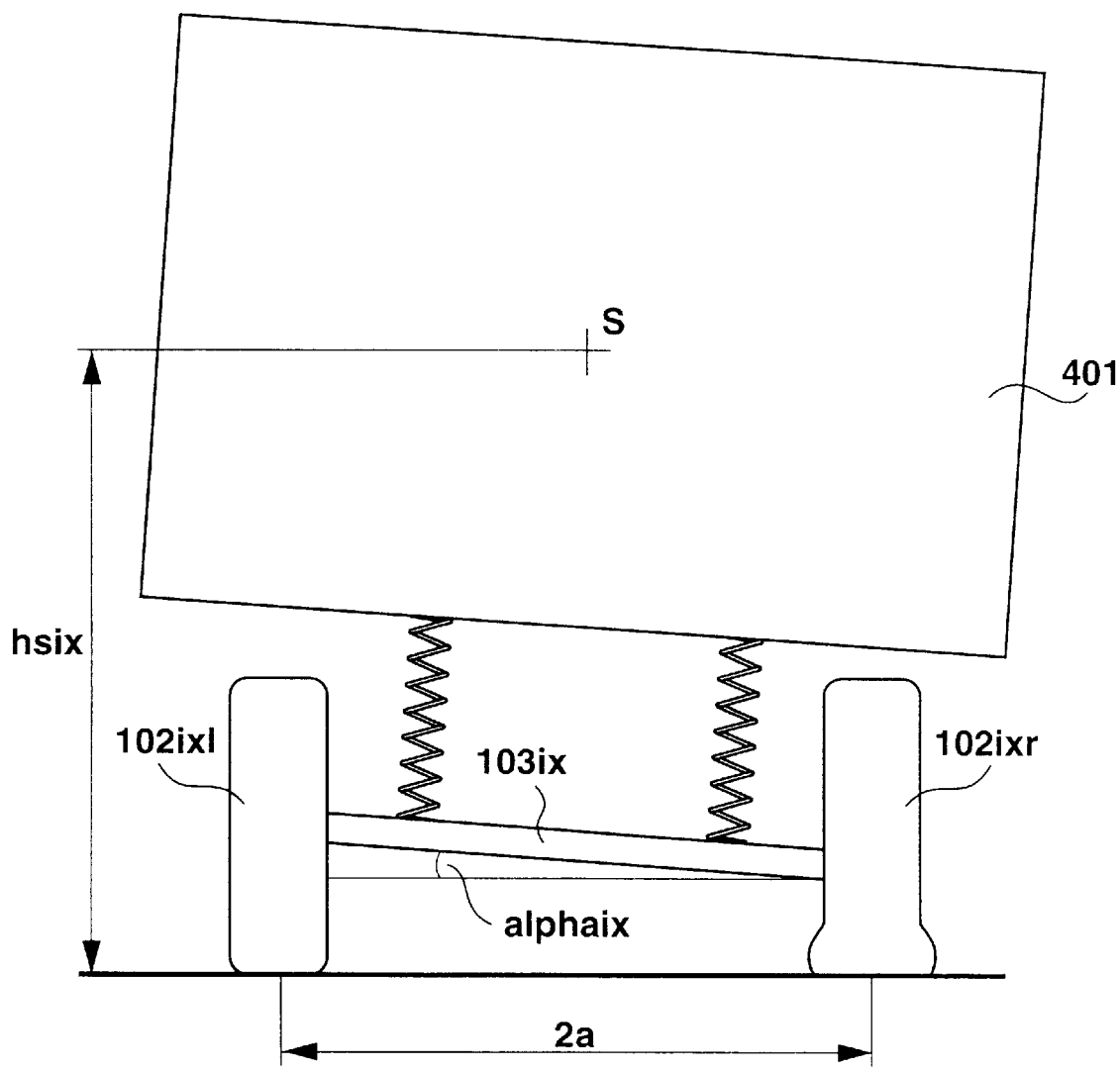
FIG. 4 shows a schematic diagram of the physical situation of a road vehicle turning a corner.

In conclusion, the physical situation on which the method according to the present invention is based will be illustrated with the help of FIG. 4. FIG. 4 shows a schematic diagram of a single-unit vehicle like that illustrated in FIG. 1*a*. However, this is not intended to restrict the scope in any way.

FIG. 4 shows a wheel axle 103*ix* with respective wheels 102*ixl* and 102*ixr*. Furthermore, vehicle superstructure 401 is connected to wheel axle 103*ix* by suspension devices 405 and 406. FIG. 4 shows wheel base 2*a* of the vehicle. Furthermore, axle-based center of gravity S and respective axle-based center of gravity height hsix are also shown. Angle of inclination alphaix of the wheel axle to the roadway surface is also shown. This vehicle is turning left.

As FIG. 4 shows, load displacement occurs in turning, with the load being reduced on wheel 102*ixl* on the inside of the turn, so that in extreme situations this wheel may even lose contact with the ground. It does not matter here whether the vehicle is turning on a flat road surface or an inclined surface. Wheel 102*ixr* on the outside of the curve is under a greater load. Due to this displacement of load on individual wheels, dynamic running radius rixj of each wheel also changes. These changes lead to an inclination of the wheel axle to the roadway surface or a corresponding displacement of the center of gravity. Furthermore, these changes can be used to detect a tendency of a vehicle to tilt about a vehicle axis oriented in the longitudinal direction of the vehicle.

In conclusion, it should be pointed out that the form of the embodiment selected for the description and the diagram in the figures should not restrict the scope of the idea of the present invention in any way.

What is claimed is:

1. A method of determining at least one quantity describing a height of a center of gravity of a vehicle, comprising the steps of:

determining a quantity describing a wheel rpm for at least one wheel of the vehicle;

determining a quantity describing a wheel performance for the at least one wheel as a function of the quantity describing the wheel rpm of the at least one wheel; and determining the at least one quantity describing the height of the center of gravity of the vehicle as a function of the quantity describing the wheel performance of the at least one wheel.

2. A method of stabilizing a vehicle, comprising the steps of:

determining a quantity describing a wheel rpm for at least one wheel of the vehicle;

determining a quantity describing a wheel performance as a function of the determined quantity describing the wheel rpm;

determining at least one quantity describing a height of a center of gravity of the vehicle as a function of the quantity describing the determined wheel performance;

determining a speed quantity as a function of the determined at least one quantity describing the height of the center of gravity of the vehicle;

determining if the vehicle has a tendency to tilt about a vehicle axis oriented in a longitudinal direction of the vehicle as a function of the determined speed quantity; and initiating at least one of braking measures on at least one wheel of the vehicle, engine measures, or measures involving chassis actuators to stabilize the vehicle, if the vehicle has a tendency to tilt about the vehicle axis oriented in the longitudinal direction of the vehicle.

3. The method according to claim 1, further comprising the steps of:

determining for the at least one wheel at least one of a drive slip and a wheel slip;

determining an absolute value of at least one of the drive slip and the wheel slip;

comparing the absolute value of at least one of the drive slip and the wheel slip with a threshold value;

determining the at least one quantity describing the height of the center of gravity of the vehicle as a function of the comparison; and performing at least one of the substeps of:

determining the at least one quantity describing the height of the center of gravity of the vehicle as a function of the quantity describing the wheel performance for the at least one wheel in a most recent time increment if the absolute value of the at least one of the drive slip and the wheel slip is less than the threshold value; and determining the at least one quantity describing the height of the center of gravity of the vehicle as a function of the quantity describing the wheel performance for the at least one wheel in a preceding time increment if the absolute value of at least one of the drive slip and the wheel slip prevailing on the at least one wheel is greater than the threshold value.

4. The method according to claim 1, wherein the step of determining the quantity describing the wheel performance of the at least one wheel includes determining a quantity dependent on a wheel load acting on the at least one wheel.

5. The method according to claim 4, wherein the quantity dependent on the wheel load includes one of a quantity describing a diameter and a radius of the at least one wheel.

6. The method according to claim 1, further comprising the steps of:

determining the quantity describing the wheel performance of the at least one wheel as a function of the quantity describing the wheel rpm of the at least one wheel, a quantity describing a vehicle speed, a quantity representing a transverse dynamic of the vehicle and a quantity describing a geometry of the vehicle; and determining the quantity describing the vehicle speed as a function of the quantity describing the wheel rpm for the at least one wheel.

7. The method according to claim 6, wherein the step of determining the quantity representing the transverse dynamics of the vehicle includes a quantity describing at least one of a yaw rate and a transverse acceleration of the vehicle.

8. The method according to claim 1, further comprising the steps of:
   determining the at least one quantity describing the height of the center of gravity of the vehicle as a function of a quantity describing a behavior of a wheel axle corresponding to a quantity describing an angle of inclination of the wheel axle to a roadway surface;
   determining quantities describing wheel performance for wheels of the wheel axle; and
   determining the quantity describing a behavior of the wheel axle as a function of a quantity describing the wheel performance for the wheels of the wheel axle and a quantity describing a geometry of the vehicle.

9. The method according to claim 8, further comprising the steps of:
   determining a quantity representing transverse dynamics of the vehicle;
   determining a quantity describing a load acting on the wheel axle; and
   determining the at least one quantity describing the height of the center of gravity of the vehicle as a function of the quantity describing the transverse dynamics of the vehicle, the quantity describing the load acting on the wheel axle, the quantity describing the geometry of the vehicle, a quantity representing a rigidity and the quantity describing the behavior of the wheel axle.

10. The method according to claim 9, further comprising the step of:
    determining the quantity representing the rigidity as a function of a resulting vertical rigidity of the at least one wheel of the wheel axle.

11. The method according to claim 9, further comprising the step of:
    determining the at least one quantity describing the height of the center of gravity of the vehicle according to the equation:

$$hsix = \frac{C \cdot a^2}{mlix \cdot aq} \cdot alphaix$$

wherein:
   C represents the resulting vertical rigidity of the wheels belonging to the wheel axle;
   a represents half a wheel base of the axle;
   alphaix represents the angle of inclination of the wheel axle to the roadway surface;
   mlix represents the load acting on the wheel axle; and
   aq represents a transverse acceleration acting on the vehicle.

12. A device for determining at least one quantity describing a height of a center of gravity of a vehicle, comprising;
    a first device determining a quantity describing a wheel rpm for at least one wheel for the vehicle;
    a second device determining a quantity describing a wheel performance for the at least one wheel as a function of the quantity describing the wheel rpm determined by the first device;
    a third device determining the at least one quantity describing the height of the center of gravity of the vehicle as a function of the quantity describing the wheel performance determined by the second device.

13. A system for stabilizing a vehicle, comprising:
    a first device determining a quantity describing a wheel rpm for at least one wheel of the vehicle;
    a second device coupled to the first device, the second device determining a quantity describing a wheel performance for the at least one wheel as a function of the quantity describing the wheel rpm determined by the first device;
    a third device coupled to the second device, the third device determining at least one quantity describing a height of a center of gravity of the vehicle as a function of the quantity describing the wheel performance determined by the second device;
    a fourth device coupled to the third device, the fourth device determining a speed quantity as a function of the at least one quantity describing the height of the center of gravity of the vehicle determined by the third device;
    a fifth device coupled to the fourth device, the fifth determining if the vehicle has a tendency to tilt about a vehicle axis oriented in a longitudinal direction of the vehicle as a function of the speed quantity determined by the fourth device; and
    a sixth device coupled to the fifth device, the sixth device for at least one of i) applying a braking force, ii) actuating a means for influencing an engine torque, and iii) actuating chassis actuator, to stabilize the vehicle if the vehicle has the tendency to tilt as determined by the fifth device.

* * * * *

UNITED STATES PATENT AND TRADEMARK OFFICE
CERTIFICATE OF CORRECTION

PATENT NO.    : 6,370,938 B1
DATED         : April 16, 2002
INVENTOR(S)   : Klaus-Diet Leimbach et al.

It is certified that error appears in the above-identified patent and that said Letters Patent is hereby corrected as shown below:

Column 10,
Line 52, change "wherein the quantity" to -- wherein the step of determining the quantity --.
Line 53, change "includes one of" to -- includes the step of determining one of --

Signed and Sealed this

Sixth Day of May, 2003

JAMES E. ROGAN
Director of the United States Patent and Trademark Office